US010277699B1

(12) United States Patent
Ali et al.

(10) Patent No.: US 10,277,699 B1
(45) Date of Patent: Apr. 30, 2019

(54) SYSTEM FOR DETERMINING PROCESS RELATIONSHIPS

(71) Applicant: AMAZON TECHNOLOGIES, INC., Seattle, WA (US)

(72) Inventors: Khawar Ali, Los Angeles, CA (US); Kevin Michael Davis, Seattle, WA (US); Krishnan Ananthanarayanan Kolazhi, Bellevue, WA (US); Onkar Bhaskar Walavalkar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 270 days.

(21) Appl. No.: 14/974,600

(22) Filed: Dec. 18, 2015

(51) Int. Cl.
*H04L 12/26* (2006.01)
*H04L 29/08* (2006.01)

(52) U.S. Cl.
CPC .......... *H04L 67/28* (2013.01); *H04L 43/0888* (2013.01)

(58) Field of Classification Search
CPC ............... G06F 9/4881; G06F 11/3409; G06F 11/3433; G06F 11/3447; G06F 11/3452; G06F 2201/81; G06F 2201/815; G06F 2201/875; G06F 2209/484; G06F 2209/485; H04L 41/00; H04L 41/145; H04L 41/0896; H04L 43/08; H04L 43/045; H04L 43/0817; H04L 43/0852; H04L 43/0876; H04L 43/0888; H04L 67/00; H04L 67/02; H04L 67/28; H04L 67/2823; H04L 69/28; H04L 45/14; H04L 45/48; H04L 43/106; H04M 2201/54; H04M 2203/55; H04M 3/51; H04M 3/42059; H04N 21/6125; H04N 21/8456
See application file for complete search history.

(56) References Cited

U.S. PATENT DOCUMENTS

| 9,654,623 | B1* | 5/2017 | Kolazhi | H04M 3/42059 |
| 2003/0204547 | A1* | 10/2003 | Davis | G06F 9/4881 |
| | | | | 718/101 |
| 2013/0067073 | A1* | 3/2013 | Niemczyk | H04L 43/045 |
| | | | | 709/224 |
| 2013/0254384 | A1* | 9/2013 | Wray | H04L 43/08 |
| | | | | 709/224 |
| 2014/0075443 | A1* | 3/2014 | Tewes | G06F 9/4881 |
| | | | | 718/102 |
| 2014/0092753 | A1* | 4/2014 | Vasseur | H04L 41/5009 |
| | | | | 370/248 |
| 2014/0359070 | A1* | 12/2014 | Sundaram | H04L 67/2823 |
| | | | | 709/219 |

* cited by examiner

*Primary Examiner* — Sargon N Nano
*Assistant Examiner* — Michael Li
(74) *Attorney, Agent, or Firm* — Lindauer Law, PLLC

(57) ABSTRACT

Described are techniques for determining relationships between related processes and, based on the relationships, determining a critical path for at least a subset of the processes. The critical path for a process may be identified by determining whether a process is able to execute after each input received by the process. When the process is able to execute, the preceding process that provided the latest-received input may be identified. The process may be repeated for one or more preceding processes until a root process is determined. Based on the critical path data for a process, changes in latency due to a change in the critical path, a change in latency for an existing process, or the addition of a new process may be determined.

20 Claims, 8 Drawing Sheets

SYSTEM FOR DETERMINING PROCESS RELATIONSHIPS

BACKGROUND

Computer systems may include large networks of related processes, in which the outputs of certain processes are used as inputs for other processes, such that the time required for a particular process to yield a result may depend on the execution time of other processes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
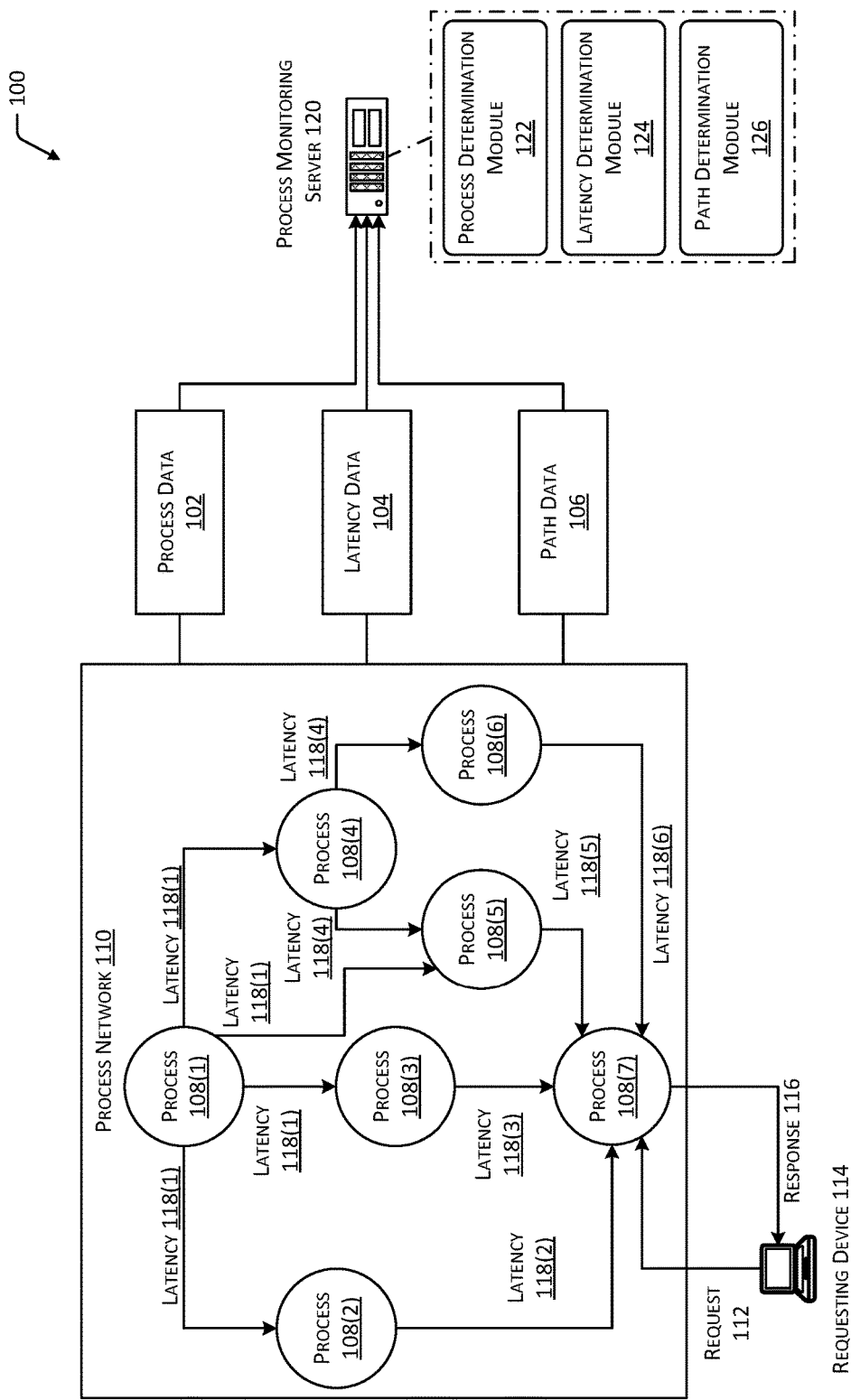
FIG. 1 depicts a system for determining process data, latency data, and path data based on processes in a process network.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many computer systems include networks of related processes in which the outputs of certain processes may be used as inputs by other processes. In some cases, the relationships between processes may be represented by a graph in which each node represents a particular process, while edges between the nodes represent the dependencies and relationships between the processes. For example, an online marketplace may be configured to determine the final cost associated with the purchase of an item. Selection of an item for purchase (e.g., via user input) may cause a request to be generated and provided to a process configured to output the final purchase cost. The process that outputs the final purchase cost may, in turn, determine the final purchase cost using inputs produced by one or more other processes. Continuing the example, a first process may access item data that includes the sales price of the selected item. A second process may determine a tax rate and a tax amount associated with one or more of the buyer's location or the seller's location. A third process, from which the second process depends, may determine the location of the buyer or the seller. A fourth process may determine a shipping cost associated with the item. The fourth process may depend on the first process, which may determine the item weight or item dimensions from the item data and provide this information to the fourth process. A fifth process may determine whether the item is eligible for a discounted shipping cost based on the total cost of all items purchased in a transaction, which may in turn depend on inputs generated by one or more of the processes described previously, or other processes. A sixth process may determine whether the item is eligible for any other promotions, such as whether the user provided a promotional code or whether a seller is currently offering a promotion. The process that outputs the final purchase cost may be unable to determine the final purchase cost until it has received inputs from one or more of the other processes.

Therefore, the latency associated with the final process may be affected by latency associated with any of the other processes preformed previously to generate the inputs of the final process. In some cases, certain preceding processes may be performed in parallel (e.g., concurrently). For example, a process to determine a tax rate and a process to determine a shipping cost use separate inputs to determine their respective outputs. Therefore, these processes may be performed independent of one another, and in some cases simultaneously. As another example, however, the process to determine the tax rate and the process to determine the shipping cost may each depend on a preceding process to determine the location of the buyer. The tax rate and shipping cost processes may use the buyer's location as an input for generating their respective outputs. Therefore, the process to determine the location of the buyer must occur prior to the tax rate and shipping cost processes, which must in turn occur prior to the final process to output the total purchase cost. When multiple processes occur sequentially, the latency of any of the sequential processes may affect the latency associated with the final process. However, when processes occur in parallel, only the parallel process having the greatest latency may affect the latency associated with the final process.

To execute a final process, multiple "paths" of sequential processes may be performed, each path beginning at a root process (e.g., a process that does not depend from another process) and terminating at the final process. Each path of processes may be executed at least partially concurrently with other paths, and in some cases, one or more paths may intersect. For example, a particular process may use inputs produced by multiple paths or may produce outputs used as inputs by multiple paths. The overall latency associated with execution of the final process may be determined based on the particular path of sequential processes having the greatest latency, termed the "critical path". The critical path may include the sequence of processes that determine the minimum time required to execute the final process. Other paths or processes that are executed concurrently with the critical path, but that have a smaller amount of latency, may not contribute to the overall latency associated with the final process. Therefore, if the latency associated with a particular final process unexpectedly increases, this increase may indicate that the latency associated with one or more of the processes on the critical path has increased. If the latency of other processes not on the critical path increases, this increase would typically not affect the latency of the final process. However, in some cases the latency associated with one or more particular processes not previously on the critical path may increase to such an extent that the critical path has changed to include the path that includes the particular process(es). Determining the critical path within a system of related processes may enable users to more efficiently determine the cause(s) of increased latency without requiring examination of the latency of each individual process in a potentially large network of processes. For example, in a network of 75 processes, 12 of the processes may be included in the critical path. If the latency of a final process increases, this increase would indicate that the latency of at least one of the 12 processes on the critical path has increased, or that the critical path has changed. This determination may obviate the need to investigate the latency of all 75 processes within the network.

In some cases, an entity may seek to add a process to a network without increasing the overall latency associated with the final process. Based on the inputs used by the additional process, the additional process may depend upon one or more other processes, and may in turn generate an output that may be used as an input by other processes. If, based on its input(s) or output(s), the additional process is associated with the critical path, then adding the process to the network may increase latency. However, if the additional process is not associated with the critical path, the process may be added without increasing latency. Additionally, based on the difference between the latency of the critical path and the latency of the path that includes the additional process, a determination of allowable latency for the additional process may be made.

This disclosure relates to systems for determining the critical path associated with one or more processes and the latency associated with the critical path. If the latency associated with a particular process increases, the source of the increased latency may be identified by determining whether any processes associated with the critical path have increased in latency or if the critical path for the particular process has changed.

The critical path for a particular process may be determined by determining each of the processes that generate inputs used by the particular process. For example, the system may determine the inputs associated with the particular process, identify the latest-received input, and determine the preceding process associated with the latest-received input. This determination may indicate that the particular preceding process that occurred latest is associated with the critical path. The method for determining the latest-received input may then be repeated for the preceding process. This method may be repeated for each preceding process that provides an input to the current process latest-in-time until it is determined that the process most recently analyzed is a root process (e.g., a process that does not depend from other processes).

Collectively, the path of processes from the root process to the final process may constitute the critical path with respect to the final process. The system may store an indication of each process associated with the critical path as critical path data for the final process. The latency associated with the critical path (e.g., the aggregate latency for each process in the critical path) may also be determined and stored as path latency data. In some implementations, critical path data and path latency data may be determined for multiple processes in a network. For example, a different critical path of processes may generate inputs for each process in the network, and each critical path may include a respective amount of latency.

In some implementations, a change in the latency associated with a particular process may be determined. For example, user input indicating high latency or input generated by an automated process configured to determine latency in excess of a threshold quantity may be received. Responsive to the change in latency, the current critical path data associated with the particular process may be determined and compared to previous critical path data. If the current critical path data includes one or more additional processes or if one or more processes previously associated with the critical path are not present in the current critical path data, this determination may indicate that the critical path for the particular process has changed. For example, one or more new processes may have been added to the network, or the latency of one or more existing processes not associated with the critical path may have increased, such that the previous critical path no longer determines the minimum time necessary to execute the particular process. Responsive to this determination, one or more control actions may be performed with regard to processes associated with the current critical path. In other implementations, the critical path associated with the particular process may remain unchanged, but the latency of one or more processes associated with the critical path may have increased. The current latency for at least a subset of the processes associated with the critical path may be compared with previous latency data to determine one or more processes for which the latency has increased. Responsive to this determination, one or more control actions may be performed with regard to processes having increased latency.

In some implementations, an entity may request to add a new process to the network. Process data indicating one or more of the inputs or outputs associated with the additional process may be received and used to determine existing processes in the network that depend from the additional process, or from which the additional process depends. Path data may be used to determine a path of processes between the additional process and a root process using the same method by which a critical path is determined. For example, the path of preceding processes that are completed latest-in-time between the root process and the additional process may be determined and stored as first path data. In some implementations, second path data may be determined by identifying a path of processes from the additional process to the final process. The sum of the latency associated with the first path data and the second path data may indicate the latency of a path including the additional process, with the exception of the latency for the additional process itself. The difference between this latency and the latency of the critical path may determine the allowable amount of latency for the additional process. For example, if the sum of the latency for the first path data and second path data exceeds the latency of the critical path, the additional process may not be added without increasing the overall latency associated with the final process. If the latency for the first path data and second path data is less than that of the critical path by a particular quantity, the additional process may have a latency less than or equal to that particular quantity without increasing the overall latency associated with the final process.

FIG. 1 depicts a system 100 for determining process data 102, latency data 104, and path data 106 based on processes 108 in a process network 110. The processes 108 may include any manner of code, service, daemon, application, or other type of computer-executable instruction, implemented in hardware or software. For example, a process 108 may be configured to access stored data or receive data from other processes 108, computing devices, or other sources as inputs, and generate one or more outputs based on the data. The output(s) may be provided to other processes 108 for use as input(s) or to one or more computing devices or data stores. The process network 110 may include one or more computer-readable storage media (CRSM) configured to store the processes 108, such as electronic storage media, magnetic storage media, optical storage media, quantum storage media, mechanical computer storage media, and so forth. For example, the processes 108 may be stored among a distributed network of servers or other computing devices and may communicate with other processes 108 and computing devices using one or more networks, such as local area networks (LANs), wireless LANs, wide area networks (WANs), wireless WANs, and so forth.

When the outputs of a particular process 108 are used as inputs by another process 108, the particular process 108 must generate its output before the other process 108 is able to use that output as an input. In other cases, a process 108 may execute to determine an output without using the outputs of one or more other processes 108 as inputs. For example, a process 108 may determine an output without requesting or accessing other processes 108, such as by accessing one or more sources of stored data independent of other processes 108. A process 108 that does not depend upon the outputs of other processes 108 may be termed a "root process". For example, FIG. 1 depicts a first process 108(1) that may generate an output that is in turn used as an input by a second process 108(2), a third process 108(3), and a fourth process 108(4). The first process 108(1), however, may not depend upon the output of other processes 108 when executing to determine its output. The second process 108(2), the third process 108(3), and the fourth process 108(4) may determine outputs based on the inputs provided by the first process 108(1). These outputs may in turn be used as inputs by other processes 108. For example, an output determined by the fourth process 108(4) may be used as an input by a fifth process 108(5) and a sixth process 108(6). Outputs determined by the second process 108(2), the third process 108(3), the fifth process 108(5), and the sixth process 108(6) may be used as inputs by a seventh process 108(7). In FIG. 1, the seventh process 108(7) may be termed an "end process" that may be accessible by devices outside of the process network 110 to request an output. For example, rather than providing an output to another process 108 for use as an input, the seventh process 108(7) may receive a request 112 from a requesting device 114 and provide a response 116 to the request 112 as an output. In some implementations, a process 108 may provide an output to a computing device, such as a response 116 to a request 112, in addition to providing the output to another process 108 for use as an input.

As one illustrative example, the requesting device 114 may include a computing device used to conduct a purchase transaction with an online marketplace. The process network 110 may store processes 108 used by the online marketplace to facilitate the purchase transaction. Upon selection of an item for purchase (e.g., via user input), the requesting device 114, or a server or other computing device in communication with the requesting device 114, may cause a request 112 to be provided to the seventh process 108(7). The seventh process 108(7) may be configured to determine the final purchase cost of the selected item and provide an indication of the final purchase cost to the requesting device 114 as a response 116.

To determine the final purchase cost, the first process 108(1) may be configured to access item data indicative of the current sales price of the item. While the item data may be static or dynamic, the first process 108(1) may access the current sales price without requiring the output from another process 108 as an input. The second process 108(2) may determine whether any discounts or promotions are applicable to the item. For example, a user associated with the requesting device 114 may provide a promotional code to receive a percentage discount, or a seller may offer such a discount at particular times. To determine the value of the percentage discount, the second process 108(2) may use the sales price of the item, determined by the first process 108(1) as an input. The third process 108(3) may modify the total purchase cost of the item by a percentage based on the payment method used to purchase the item or other factors associated with the transaction. To apply a modifier to the purchase cost, the third process 108(3) may use the sales price of the item, determined by the first process 108(1) as an input. The fourth process 108(4) may be configured to determine a location associated with one or more of the seller of the item or the user purchasing the item. Based on the sales price determined by the first process 108(1) and the location(s) determined by the fourth process 108(4), the fifth process 108(5) may determine a tax rate associated with the item. For example, a tax rate may include a percentage of the sales price of the item, and the tax rate may vary depending on the location of one or more of the purchaser or the seller. Based on the location(s) determined by the fourth process 108(4), the sixth process 108(6) may determine a shipping cost associated with the item. For example, the shipping costs for an item may vary depending on the location of the purchaser, the distance between the purchaser and the seller, and so forth. The seventh process 108(7) (e.g., the "end process") may use the outputs produced by each of the preceding processes as inputs for determining the total purchase cost of the item, which may be provided to the requesting device 114 as a response 116.

Each process 108 may be executed once the inputs used by the process 108 have been determined. As such, at least a subset of the processes 108 in the process network 110 may execute in parallel (e.g., concurrently). For example, the second process 108(2), the third process 108(3), and the fourth process 108(4) do not require the outputs of any of the second, third, or fourth processes 108 for use as inputs. Therefore, the second process 108(2), the third process 108(3), and the fourth process 108(4) may occur at least partially concurrently. Processes 108 that depend on the output(s) of other process(es) 108 may refrain from executing until the preceding processes 108 have completed and provided the input(s) used by the dependent processes 108. As such, dependent processes may be executed sequentially, defining a "path" of processes. For example, the fifth process 108(5) and the sixth process 108(6) may not be executed until the fourth process 108(4) has completed. The seventh process 108(7) may not be executed until the second process 108(2), the third process 108(3), the fifth process 108(5), and the sixth process 108(6) have completed. Continuing the example, FIG. 1 depicts fourth paths of processes 108 between the root process 108(1) and the end process 108(7): the first, second, and seventh processes 108; the first, third, and seventh processes 108; the first, fourth, fifth, and seventh processes 108; and the first, fourth, sixth, and seventh processes 108.

Each process 108 may include an associated quantity of latency 118. Latency 118 may include a measurement of time, such as a number of milliseconds for a process to execute 108. In other implementations, latency 118 may include a relative measurement, such as a number of processor cycles that occur while a process 108 is executed. For example, the first process 108(1) may include a first latency 118(1), the second process 108(2) may include a second latency 118(2), the third process 108(3) may include a third latency 118(3), the fourth process 108(4) may include a fourth latency 118(4), the fifth process 108(5) may include a fifth latency 118(5), the sixth process 108(6) may include a sixth latency 118(6), and the seventh process 108(7) may include a seventh latency 118(7). The latency 118 for a process 108 may include the execution time associated with the process 108. For example, the latency 118 of a process 108 may include the time taken for the process 108 to determine, receive, or access, one or more inputs, manipulate, analyze, or process the inputs to determine an output, and to store the output or provide the output to another process 108 or device. The latency 118 for each path of processes 108 may include the sum of the latency 118 for each individual process 108 associated with the path. As described previously, the path of processes 108 having the greatest latency 118 may be termed the "critical path", which defines the minimum time in which the response 116 may be provided responsive to the request 112. For example, if the latency 118 associated with one or more processes 108 of the critical path increase or decrease, the latency 118 perceived by the requesting device 114 responsive to the request 112 may increase or decrease. However, if the latency 118 associated with one or more processes 108 that are not on the critical path increases or decreases, this may not affect the latency 118 perceived by the requesting device 114 unless the latency 118 of a path of processes 108 increases to such an extent that it exceeds the latency 118 of the critical path.

A process monitoring server 120 may be used to determine process data 102, latency data 104, and path data 106, based on the processes 108 in the process network 110 and the respective latencies 116 of the processes 108. While FIG. 1 depicts the process monitoring server 120 as a single server, the functions of the process monitoring server 120 may be performed by any quantity or type of computing devices, such as mobile devices, set-top boxes, tablet computers, personal computers, wearable computers, servers, and so forth. Additionally, while FIG. 1 depicts the process monitoring server 120 as separate from the process network 110, in some implementations, the process network 110 may be stored on or in association with the process monitoring server 120. A process determination module 122 associated with the process monitoring server 120 may determine the process data 102. The process data 102 may include the inputs and outputs associated with at least a subset of the processes 108. In some implementations, the process data 102 may also include other data and metadata associated with the process(es) 108, such as process identifiers, indications of the author(s) of particular process(es) 108, the access times or access frequencies of particular process(es) 108, and so forth. A latency determination module 124 associated with the process monitoring server 120 may determine the latency data 104. The latency data 104 may include indications of the latency 118 for at least a subset of the processes 108. In some implementations, the latency data 104 may also include time data indicative of the times at which particular latencies 118 occurred. For example, the latency data 104 may indicate a range of possible latency values for a process 108, a historical profile of the latency 118 for a process 108 over time, and so forth. A path determination module 126 associated with the process monitoring server 120 may determine the path data 106. The path data 106 may indicate particular processes 108 that are associated with a path, the latency 118 associated with one or more paths, and an indication of a critical path associated with a set of processes 108. In some implementations, the path data 106 may be determined from the processes 108, such as by determining the times at which particular processes 108 execute based on inputs received from other processes 108. In other implementations, the path determination module 126 may determine path data 106 based at least in part on the process data 102. For example, based on the inputs and outputs associated with one or more processes 108, the path determination module 126 may determine relationships between processes 108, such as processes 108 that depend upon the outputs of other processes 108 for use as inputs.

Based on one or more of the process data 102, the latency data 104, or the path data 106, the process monitoring server 120 may determine particular processes 108 that cause a change in perceived latency 118 or a change in one or more critical paths associated with the process network 110. The process monitoring server 120 may also determine the extent to which the latency 118 of a particular process 108 may change without increasing the latency 118 perceived by a requesting device 114. The process monitoring server 120 may further determine the amount of latency 118 a prospective new process 108 to be added to the process network 110 may include without increasing the latency 118 perceived by a requesting device 114.

Figure 2:
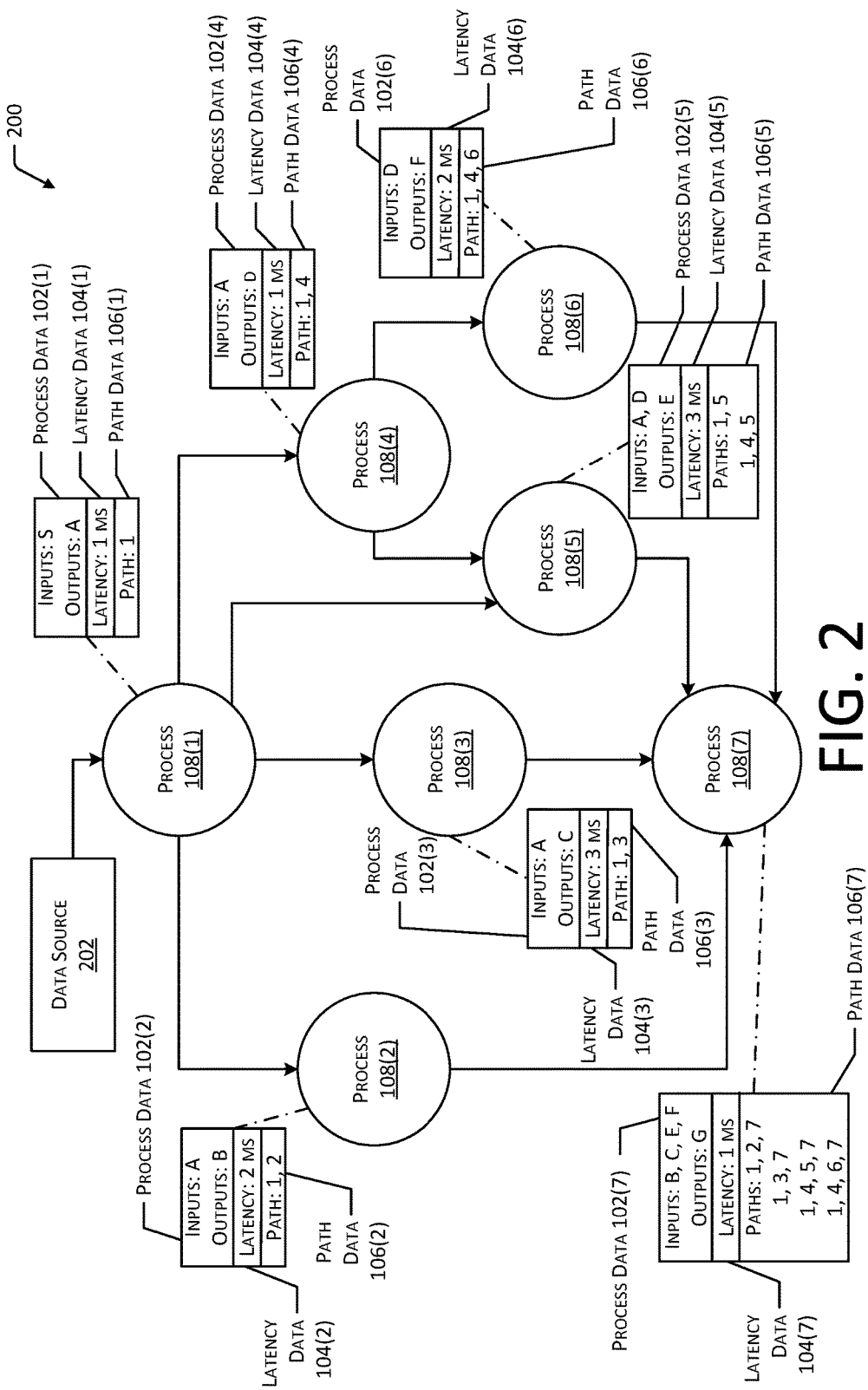
FIG. 2 is a block diagram depicting a process network and the process data, latency data, and path data associated with the processes in the process network.

FIG. 2 is a block diagram 200 depicting a process network 110 and the process data 102, latency data 104, and path data 106 associated with the processes 108 in the process network 110. As described previously with regard to FIG. 1, an example process network 110 may include a first process 108(1) that is a "root process", which determines one or more inputs from one or more data sources 202. Data sources 202 may include, for example, any manner of CRSM and any manner of data structure to store information, such as flat files, databases, linked lists, trees, executable codes, scripts, and so forth. For example, a data source 202 may include data associated with one or more items available for purchase, and the first process 108(1) may be configured to access the item data to determine one or more characteristics of an item, such as a purchase price. Based on the input(s) determined from the data source 202 (e.g., "Inputs: S"), the first process 108(1) may determine one or more outputs (e.g., "Outputs: A"). Process data 102(1) associated with the first process 108(1) may include the inputs and outputs of the first process 108(1). Latency data 104(1) associated with the first process 108(1) may include an execution time of the first process 108(1) (e.g., "Latency: 1 ms"). Path data 106(1) associated with the first process 108(1) may include one or more paths of processes 108 from a root process to the first process 108(1), which in the case of the first process 108(1) (a root process) would include only the path of the first process 108(1), itself (e.g., "Path: 1").

Process data 102(2) associated with the second process 108(2) may indicate the input(s) (e.g., "Inputs: A") and output(s) (e.g., "Outputs: B") of the second process 108(2). For example, the second process 108(2) may determine one or more outputs based on one or more inputs determined from the first process 108(1). Latency data 104(2) associated with the second process 108(2) may indicate the execution time of the second process 108(2) (e.g., "Latency: 2 ms"). Path data 106(2) associated with the second process 108(2) may include one or more paths of processes 108 from a root process to the second process 108(2). For example, the path from the first process 108(1) to the second process 108(2) would include two paths of processes 108 (e.g., "Path: 1, 2").

Process data 102(3) associated with the third process 108(3) may indicate the input(s) (e.g., "Inputs: A") and output(s) (e.g., "Outputs: C") of the third process 108(3). For example, the third process 108(3) may determine one or more outputs based on one or more inputs determined from the first process 108(1). Latency data 104(3) associated with the third process 108(3) may indicate the execution time of the third process 108(3) (e.g., "Latency: 3 ms"). Path data 106(3) associated with the third process 108(3) may include one or more paths of processes from a root process to the third process 108(3). For example, the path from the first process 108(1) to the third process 108(3) would include two paths of processes 108 (e.g., "Path: 1, 3").

Process data 102(4) associated with the fourth process 108(4) may indicate the input(s) (e.g., "Inputs: A") and output(s) (e.g., "Outputs: D") of the fourth process 108(4). For example, the fourth process 108(4) may determine one or more outputs based on one or more inputs determined from the first process 108(1). Latency data 104(4) associated with the fourth process 108(4) may indicate the execution time of the fourth process 108(4) (e.g., "Latency: 1 ms"). Path data 106(4) associated with the fourth process 108(4) may include one or more paths of processes from a root process to the fourth process 108(4). For example, the path from the first process 108(1) to the fourth process 108(4) would include two paths of processes 108 (e.g., "Path: 1, 4").

Process data 102(5) associated with the fifth process 108(5) may indicate inputs and outputs of the fifth process 108(5). For example, the fifth process 108(5) may be configured to determine multiple inputs from the first process 108(1) and the fourth process 108(4) (e.g., "Inputs: A, D") to determine one or more outputs (e.g., "Outputs: E"). In some cases, the fifth process 108(5) may determine an input from the first process 108(1) prior to determining an input from the fourth process 108(4). However, if the fifth process 108(5) is configured to require two inputs, the fifth process 108(5) may not execute until the fourth process 108(4) also completes. Latency data 104(5) associated with the fifth process 108(5) may indicate the execution time of the fifth process 108(5) (e.g., "Latency: 3 ms"). Path data 106(5) associated with the fifth process 108(5) may include one or more paths of processes from a root process to the fifth process 108(5). For example, two paths from the first process 108(1) to the fifth process 108(5) may exist, one path associated with each input provided to the fifth process 108(5) (e.g., "Paths: 1, 5" and "1, 4, 5"). When multiple paths of processes 108 exist between one or more root processes and a particular process 108, such as the fifth process 108(5), the path of processes 108 having the greatest latency 118 may be the critical path with regard to the particular process 108. For example, the latency 118 of a first path including the first process 108(1) and the fourth process 108(4) may exceed the latency 118 of a second path including only the first process 108(1). Therefore, if the latency of the second path were to increase, this increased latency may not increase the total latency associated with the fifth process 108(5). For example, if the latency 118 of the first path exceeds that of the second path by one millisecond, an additional process 108 having a latency 118 of one millisecond could be added to the second path without increasing the overall latency 118 associated with the fifth process 108(5). However, if the additional process 108 had a latency 118 of two milliseconds, the addition of this process 108 would increase the overall latency 118 associated with the fifth process 108(5) by one millisecond. Additionally, the path of processes 108 that included the first process 108(1) and the additional process 108 would then define the critical path for the fifth process 108(5).

Process data 102(6) associated with the sixth process 108(6) may indicate the input(s) (e.g., "Inputs: D") and output(s) (e.g., "Outputs: F") of the sixth process 108(6). For example, the sixth process 108(6) may determine one or more outputs based on one or more inputs determined from the fourth process 108(4). Latency data 104(6) associated with the sixth process 108(6) may indicate the execution time of the sixth process 108(6) (e.g., "Latency: 2 ms"). Path data 106(6) associated with the sixth process 108(6) may include one or more paths of processes from a root process to the sixth process 108(6). For example, the path from the first process 108(1) to the sixth process 108(6) would include three paths of processes 108 (e.g., "Path: 1, 4, 6").

As described previously with regard to FIG. 1, the seventh process 108(7) in the process network 110 may be an "end process" configured to provide a response 116 to one or more computing devices external to the process network 110 responsive to a request 112. Based on the inputs determined from the second process 108(2), third process 108(3), fifth process 108(5), and sixth process 108(6), the seventh process 108(7) may determine one or more outputs. Process data 102(7) associated with the seventh process 108(7) may indicate the inputs (e.g., "Inputs: B, C, E, F") and outputs (e.g., "Outputs: G") of the seventh process 108(7). Latency data 104(7) associated with the seventh process 108(7) may indicate the execution time of the seventh process 108(7) (e.g., "Latency: 1 ms"). Path data 106(7) associated with the seventh process 108(7) may include one or more paths of processes from a root process to the seventh process 108(7). For example, four paths from the first process 108(1) to the seventh process 108(7) may exist, one path associated with each input provided to the seventh process 108(7) (e.g., "Paths 1, 2, 7"; "1, 3, 7"; "1, 4, 5, 7"; and "1, 4, 6, 7").

The particular path of processes 108 having the greatest latency 118 may be the critical path with regard to the seventh process 108(7). For example, the latency 118 of a first path including the first process 108(1) and the second process 108(2) may include four milliseconds. The latency 118 of a second path including the first process 108(1) and the third process 108(3) may include five milliseconds. The latency 118 of a third path including the first process 108(1), the fourth process 108(4), and the fifth process 108(5) may include six milliseconds. The latency 118 of a fourth path including the first process 108(1), the fourth process 108(4), and the sixth process 108(6) may include five milliseconds. Based on this example, the third path may be the critical path with regard to the seventh process 108(7). Therefore, if one of the other paths of processes 108 were to increase in latency 118, this increased latency 118 may not increase the total latency 118 associated with the seventh process 108(7).

For example, if the second process 108(2) were to increase in latency 118 by two additional milliseconds, the overall latency 118 associated with the seventh process 108(7) may remain constant. However, if the second process 108(2) were to increase in latency 118 by a quantity greater than two milliseconds, the overall latency 118 associated with the seventh process 108(7) may increase, and the path that includes the first process 108(1) and the second process 108(2) would then define the critical path. By determining the latency data 104(7) and path data 106(7) associated with the seventh process 108(7), the process monitoring server 120 may determine whether the critical path associated with the seventh process 108(7) has changed. For example, if the latency 118 associated with one or more of the processes 108 of the critical path increases or decreases, the overall latency 118 associated with the seventh process 108(7) may change. The latency data 104(7) may indicate an increase or decrease in the latency 118 associated with the seventh process 108(7), while the path data 106(7) may indicate that the critical path has not changed. The latency data 104 for individual processes 108 associated with the critical path may be compared to previous latency data 104 for those processes 108 to determine the particular process(es) 108 that have caused the change in the overall latency 118 with regard to the seventh process 108(7). As another example, the latency 118 associated with one or more of the particular processes 108 separate from the critical path may increase such that the latency 118 for the path of the particular process(es) exceeds that of the critical path. In such a case, the latency data 104(7) may indicate an increase in the latency 118 associated with the seventh process 108(7), and the path data 106(7) may indicate that the critical path has changed. Changes in the critical path may be determined by comparing the path data 106(7) for the seventh process 108(7) with previous path data 106(7). The latency data 104 for individual processes 108 associated with the new critical path may be compared to previous latency data 104 for those processes 108 to determine the particular process(es) 108 that have caused the change in the overall latency 118 with regard to the seventh process 108(7).

Figure 3:
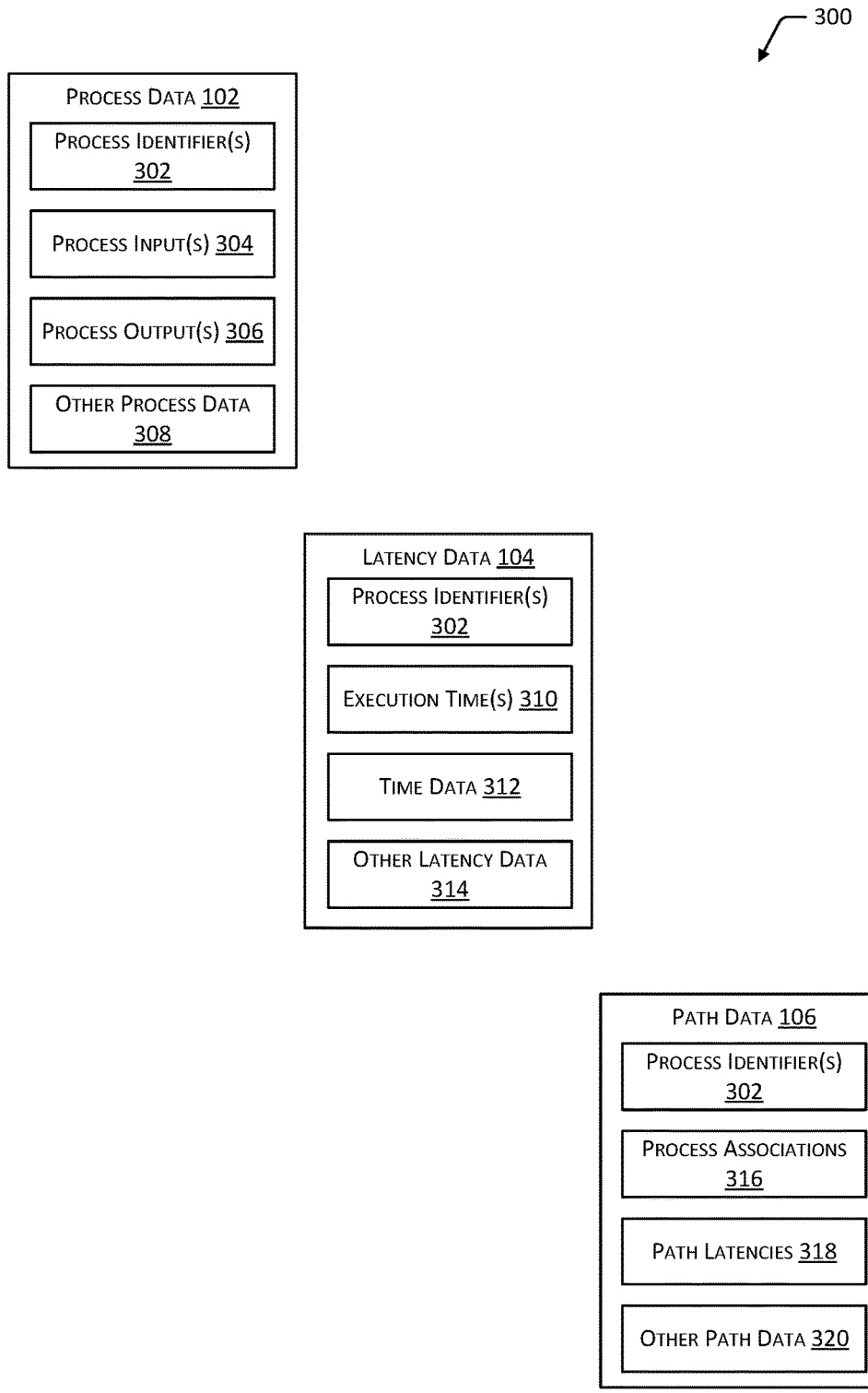
FIG. 3 depicts block diagrams illustrating example process data, latency data, and path data.

FIG. 3 depicts block diagrams 300 illustrating example process data 102, latency data 104, and path data 106. Process data 102 may include data, metadata, and so forth indicative of characteristics of one or more processes 108. For example, the process data 102 for a particular process 108 may include one or more process identifiers 302. A process identifier 302 may include one or more of alphanumeric data, audio data, image data, or another type of human or machine-readable data that may be used to differentiate a particular process 108 from other processes 108. For example, a process identifier 302 may include a name, a number, an alphanumeric string, and so forth. In some implementations, a process identifier 302 may be interpretable by a computing device without being readily interpretable by a human user.

The process data 102 may also include indications of one or more process inputs 304 and process outputs 306. In some implementations, the process inputs 304 and process outputs 306 may be determined based on the code, algorithms, and so forth used by a process 108 to generate one or more process outputs 306 based on one or more process inputs 304. In other implementations, metadata associated with a process 108 may identify one or more of the process inputs 304 or process outputs 306 associated with the process 108. In still other implementations, one or more of process inputs 304 or process outputs 306 may be determined based on the activity of a process 108 within a process network 110. For example, a process 108 may request particular data (e.g., outputs) from other processes 108 for use as process inputs 304. The process 108 may also receive requests for particular data (e.g., outputs) for use by other processes 108 as process inputs 304. Based on these requests for data, one or more of the process inputs 304 or process outputs 306 may be determined.

Other process data 308 may include data or metadata indicative of the algorithms or other manipulations of data performed by a process 108. Other process data 308 may further include indications of the author of a process 108, the times at which a process 108 is accessed, the frequencies at which a process 108 is accessed, the times at which a process 108 is modified, version identifier(s) associated with a process 108, data indicative of access credentials for accessing the process 108, encryption features used by the process 108, the location of one or more of the process 108, a source of process inputs 304, or a recipient of process outputs 306 within a process network 110, and so forth. In some implementations, other process data 308 may include an indication regarding whether completion of a process 108 is required to produce a particular response 116, or whether the process 108 is optional. For example, a particular process 108 may determine additional information regarding an item or transaction that is non-essential for informing a user regarding an item or completion of a transaction. If a particular process 108 is indicated as non-essential, the particular process 108 may be selectively omitted if the latency 118 associated with other processes 108 or paths of processes 108 increases, such that the overall latency 118 of the path that includes the particular process 108 may remain generally constant (e.g., below a threshold amount). In some implementations, if a particular process 108 indicated as non-essential begins to execute, but the latency 118 of the process 108 exceeds a certain amount before the process 108 is completed, the process 108 may be terminated, such that the overall latency 118 of the path that includes the particular process 108 does not increase significantly.

Latency data 104 may include indicia of latencies 118 associated with one or more processes 108. The latency 118 for a process 108 may include the time taken for the process 108 to determine, receive, or access, one or more process inputs 304, to manipulate, analyze, or process the inputs to determine one or more process outputs 306, and to manipulate, store, or provide the output to another process 108 or device. As such, the latency data 104 may include one or more execution times 310 for a process 108. For example, an execution time 310 for a process 108 may be stored in association with a process identifier 302 corresponding to the process 108. In some implementations, a process 108 capable of performing different functions, using different inputs, or determining different outputs may have multiple associated execution times 310. Additionally, in some cases, the execution time(s) 310 of a process 108 may change based on a load associated with the process 108 or with one or more networks or connections associated with the process 108.

The latency data 104 may also include time data 312. Time data 312 may include indications of particular times, ranges of times, relative times, and so forth at which particular execution times 310 are determined. For example, the time data 312 and the execution times 310 may be used to determine the latency 118 of a process 108 over time, such as by generating a profile of the historical latency 118 of the process 108.

Other latency data 314 may include latency times specific to receipt of process inputs 304 or generation of process outputs 306, latency times specific to particular networks or connections, or other sources of latency 118 not associated with the execution time(s) 310 of a process 108. Other latency data 314 may also include latencies 118 of data sources 202 from which a process 108 may determine inputs.

Path data 106 may include indications of relationships between processes 108 that define a "path" for particular processes 108. For example, the path data 106 associated with a particular process 108 may include indications of one or more of the processes 108 that provide inputs to the particular process 108, preceding processes 108 that provide inputs to those processes 108, and so forth, until a relationship is determined with one or more root processes 108. The resulting paths may include a chain of dependent processes 108 extending from a root process 108 to the particular process 108. As such, the path data 106 may include one or more process identifiers 302 stored in association with one or more process associations 316. The process associations 316 may indicate relationships between processes 108. For example, a relationship between a particular process 108 and one or more other processes 108 may include a dependency or child relationship, such as the particular process 108 using one or more process outputs 306 from other processes 108 as process inputs 304. The particular process 108 may be termed a dependent or child process due to the inability of the particular process 108 to be successfully executed until at least a portion of the process inputs 304 used by the particular process 108 are received. Another example relationship may include a parent relationship. For example, a particular process 108 may determine a process output 306 that is then provided to another process 108 for use as a process input 304 by the other process 108. A particular process 108 may depend from zero processes 108 (e.g., a root process), a single process 108, or multiple processes 108. Similarly, any number of other processes 108, including zero processes 108, may depend from the particular process 108.

In some implementations, the path data 106 may also include one or more path latencies 318. The path latency 318 may indicate an execution time 310 for the path of processes 108. Because each process 108 in a path of processes 108 may have a dependent relationship with the preceding process 108, the processes 108 in a path may be executed sequentially. Therefore, the path latency 318 may be equal to the sum of the individual latencies 118 for each process 108 associated with the path.

In some cases, a process 108 may include multiple paths between that process 108 and one or more root processes 108. For example, each preceding process 108 that provides an input to a particular process 108 may be associated with a different path. In some implementations, based on the path latencies 318, a critical path for the particular process 108 may be determined. For example, the path having the greatest path latency 318 may define the minimum amount of time needed for the particular process 108 to be executed.

Other path data 320 may include an indication of the critical path for a process 108. In some implementations, other path data 320 may include time data 312. For example, the critical path for a particular process 108 may change over time. The process associations 316, path latencies 318, and time data 312 may be used to generate a profile of the historical critical path(s) for a process 108.

Figure 4:
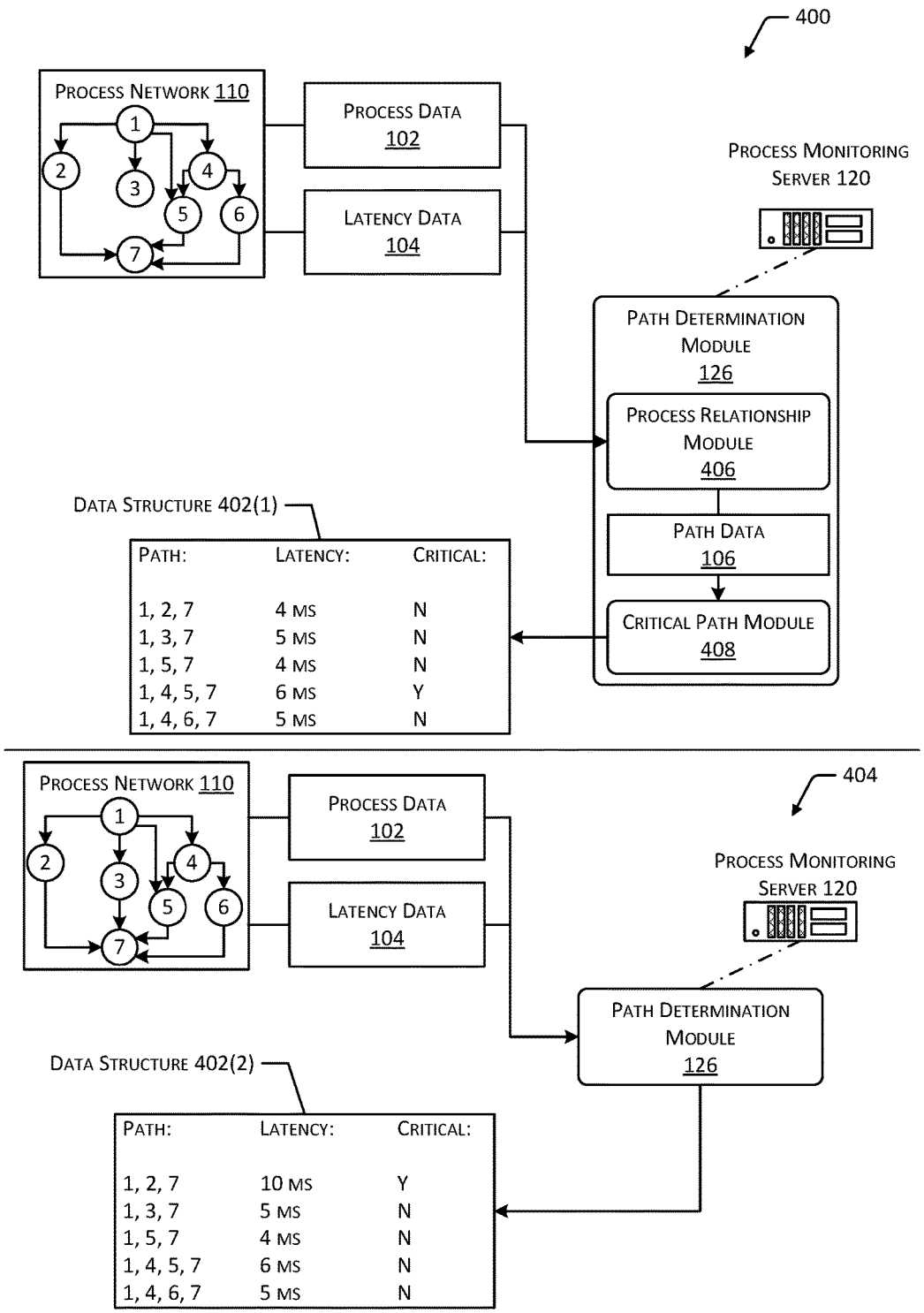
FIG. 4 depicts example systems for generating data structures based on path data associated with a process.

FIG. 4 depicts example systems 400 for generating data structures 402 based on path data 106 associated with a process 108. A first example system is shown at 400, and a second example system is shown at 404. As described previously with regard to FIG. 1, a process monitoring server 120 may determine process data 102 from a process network 110 that includes one or more processes 108. For example, a process determination module 122 of the process monitoring server 120 may determine process inputs 304, process outputs 306, and so forth with regard to one or more processes 108 of the process network 110. A latency determination module 124 of the process monitoring server 120 may determine latency data 104 associated with the processes 108 of the process network 110. The path determination module 126 of the process monitoring server 120 may determine path data 106 from one or more of the process data 102, the latency data 104, or the processes 108 of the process network 110. For example, based on the process inputs 304 and process outputs 306 of the process data 102, a process relationship module 406 of the path determination module 126 may determine process associations 316. Continuing the example, for at least a subset of process outputs 306 determined by one or more of the processes 108, the process relationship module 406 may determine other processes 108 that use these process outputs 306 as process inputs 304. Based on the process associations 316, the process relationship module 406 may determine one or more paths of processes 108 for particular processes 108 of the process network 110. The process relationship module 406 or another module may determine path latencies 318 associated with one or more of the paths. For example, based on the latency data 104 for a set of processes 108 associated with a path, a path latency 318 may be determined, such as by determining the sum of the individual latencies 118 for each process 108 of the path.

A critical path module 408 associated with the path determination module 126 may determine a critical path for at least a subset of the processes 108 based on the path data 106. For example, the critical path module 408 may generate a data structure 402(1) that associates each determined path with a corresponding path latency 318. The critical path module 408 may then determine the path having the greatest latency to be the critical path for a particular process 108. In some implementations, the process monitoring server 120 may determine the latency data 104 and the path data 106 for at least a subset of the processes 108 periodically or continuously. For example, each process 108 may include a latency 118 and a critical path associated therewith, and as the latency 118 or critical path for a process 108 changes, periodic or continuous determination by the process monitoring server 120 may modify the latency data 104 or path data 106 associated with the process(es) 108.

The first data structure 402(1) shown in connection with the system 400 includes five example paths of processes 108, each having a different latency 118. The fourth example path (e.g., "1, 4, 5, 7") is shown including a latency 118 value that exceeds the latency of the other paths. Therefore, the first data structure 402(1) includes an indication that the fourth example path is a critical path of the system 400. In some cases, a path having a smaller number of processes 108 may be determined as the critical path of a system 404 due to the apparently shorter path having a greater latency 118 than other paths of processes 108. In other cases, the latency 118 of a particular process 108 may change, causing the critical path of the system 404 to change. In the second system 404 shown in FIG. 4, the latency 118 of the first example path (e.g., "1, 2, 7") exceeds that of each of the other example paths, including paths that include a greater number of processes 108 than the first example path.

Figure 5:
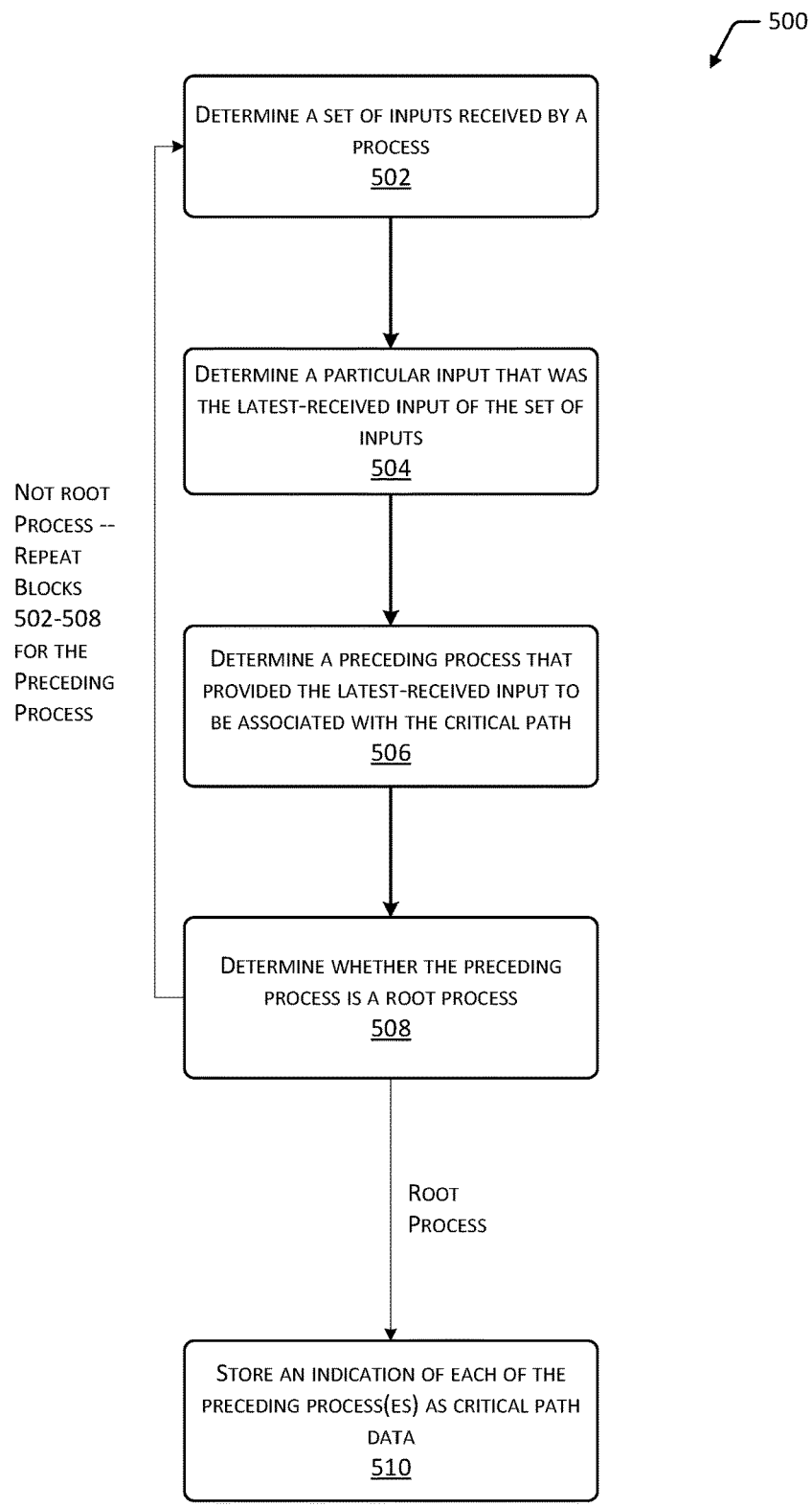
FIG. 5 is a flow diagram illustrating a method for determining a critical path associated with a process.

FIG. 5 is a flow diagram 500 illustrating a method for determining a critical path associated with a process 108. For example, each process 108 within a process network 110 may have a particular critical path associated therewith. Continuing the example, a process 108 may receive one or more process inputs 304 from one or more other processes 108. Each of the preceding processes 108 may in turn receive process inputs 304 from additional preceding processes 108. For each process 108 that provides a process input 304 to a particular process 108, one or more paths of processes 108 from the particular process 108 to a root process 108 may exist. For example, in the process network 110 depicted in FIG. 1, the seventh process 108(7) receives inputs from four preceding processes 108, and five paths are defined between the seventh process 108(7) and the first process 108(1) (e.g., the root process for the process network 110). The data structures 402 shown in FIG. 4 list each of the five paths of processes 108. The critical path for the seventh process 108(7) may include the path of processes 108 having the greatest latency 118, which would determine the minimum time required for the seventh process 108(7) to execute.

Block 502 determines a set of process inputs 304 received by a process 108. For example, a particular process 108 for which critical path data is to be determined may be selected. In some implementations, the process monitoring server 120 may be configured to periodically or continuously determine critical path data for each process 108 in a process network 110. When an attempt to execute a particular process 108 is initiated, the particular process 108 may provide requests to other processes 108 based on the process inputs 304 used by the particular process 108 to determine a process output 306. The process inputs 304 received by the particular process 108 and the times at which the process inputs 304 are received may be stored, such as in a log.

Block 504 determines a particular process input 304 that was the latest-received process input 304 of the set of process inputs 304. For example, the particular process 108 may use process outputs 306 received from one or more preceding processes 108 as a process input 304. The times at which these process outputs 306 are received by the particular process 108 may depend on the latency 118 associated with the preceding processes 108, as well as other processes 108 from which the preceding processes 108 may depend.

Block 506 determines a preceding process 108 that provided the latest-received process input 304 to the particular process 108. The preceding process 108 may be determined to be associated with the critical path. Because the critical path for the particular process 108 includes the path of processes 108 that define the minimum time necessary for the particular process 108 to be completed, the preceding process 108 that provides a process input 304 after a process input 304 is received from each of the other preceding processes 108 would be associated with the critical path.

Block 508 determines whether the preceding process 108 is a root process 108. As described previously with regard to FIG. 2, a root process 108 may not receive process inputs 304 from other processes 108 and may instead determine process outputs 306 based on other data sources 202. As such, a root process 108 would be unaffected by the latency 118 of other processes 108. The preceding process 108 may be determined to be a root process 108 based on the process data 102 determined therefrom (e.g., by the process determination module 122). For example, the process data 102 may indicate that the process inputs 304 of the preceding process 108 are not associated with other processes 108.

If the preceding process 108 is determined not to be a root process 108, blocks 502 through 508 may be repeated for the preceding process 108. For example, a set of process inputs 304 for the preceding process 108 may be determined and the latest-received process input 304 may be identified. Then, the process 108 associated with the latest-received process input 304 of the preceding process 108 may be determined. If this process 108 is not a root process 108, blocks 502 through 508 may be repeated for the process 108, and so forth.

If a preceding process 108 is determined to be a root process 108, the method may proceed to block 510. Block 510 stores an indication of each of the preceding processes 108 determined by blocks 502 through 508 as critical path data 106. For example, critical path data 106 may be determined for the seventh process 108(7) of the process network 110 shown in FIG. 1. The seventh process 108(7) utilizes four process inputs 304 received from the second process 108(2), the third process 108(3), the fifth process 108(5), and the sixth process 108(6). The process input 304 from the second process 108(2) may be received first, followed by the process inputs 304 from the third process 108(3) and the sixth process 108(6). The process input 304 from the fifth process 108(5) may be received last. Upon determination that the fifth process 108(5) is not a root process 108, the method may be repeated for the fifth process 108(5). The fifth process 108(5) utilizes two process inputs 304 received from the first process 108(1) and the fourth process 108(4). The process input 304 from the first process 108(1) may be received first, followed by the process input 304 from the fourth process 108(4). Upon determination that the fourth process 108(4) is not a root process 108, the method may be repeated for the fourth process 108(4), which utilizes a single process input 304 from the first process 108(1). Upon determination that the first process 108(1) is a root process 108, indications of each process 108 in this path—the seventh process 108(7), the fifth process 108(5), the fourth process 108(4), and the first process 108(1)—may be stored as critical path data.

Figure 6:
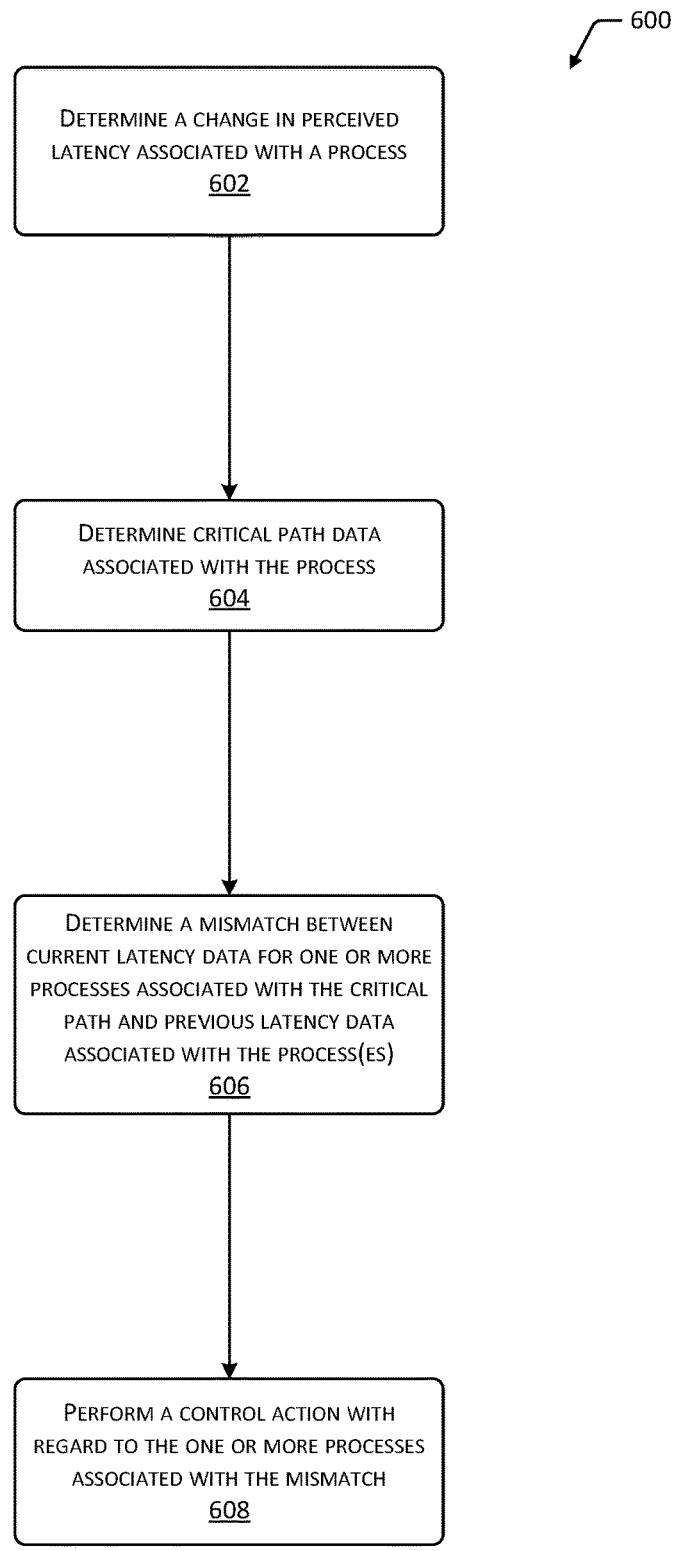
FIG. 6 is a flow diagram illustrating a method for determining one or more processes causing a change in perceived latency associated with a particular process.

FIG. 6 is a flow diagram 600 illustrating a method for determining one or more processes 108 causing a change in perceived latency 118 associated with a particular process 108. Block 602 determines a change in perceived latency 118 associated with a process 108. For example, referring to the process network 110 shown in FIG. 1, a requesting device 114 may perceive increased latency 118 associated with the seventh process 108(7) when responding to a request 112. However, because the seventh process 108(7) utilizes inputs from multiple other processes 108, which in turn utilize inputs from additional processes 108, the perceived latency 118 associated with the seventh process 108(7) may be affected by the latency 118 associated with one or more preceding processes 108. In other implementations, a change in perceived latency 118 may be determined by the process monitoring server 120, which may determine latency data 104 for a process 108 that differs from previous latency data 104. In still other implementations, a change in perceived latency 118 may be determined by identifying a change in the critical path data 106 associated with a process 108. For example, a mismatch between current critical path data 106 and previous critical path data 106 associated with the process 108 may be determined. The critical path for the process 108 may change if latency 118 associated with one or more other processes 108 changed or if one or more processes 108 were added to or removed from the process network 110. A change in the critical path for a particular process 108 may result in a change to the latency 118 associated with the particular process 108.

Block 604 determines critical path data 106 associated with the process 108. Critical path data may be determined using the method illustrated in FIG. 5. In other implementations, previous critical path data 106 associated with the process 108 may be accessed. The critical path data 106 may be used to determine a subset of processes 108 within the process network 110 that may potentially affect the perceived latency 118 of the particular process 108. Because the critical path data 106 includes each of the processes 108 in a path that provided the latest-received process inputs 304 to the subsequent process 108, processes 108 that are not associated with the critical path may not affect the perceived latency 118. Therefore, determining the critical path data 106 may facilitate an efficient determination of the source of a change in perceived latency 118 by obviating the need to analyze latency data 104 for each process 108 in a process network 110. In some implementations, determining the critical path data 106 may include determining that the critical path for a particular process 108 has changed. For example, a new process 108 may have been added to the critical path, which may be contributing to increased latency 118. As another example, the latency of an existing process 108 not associated with the critical path or the addition of a new process 108 to a different path of processes 108 may cause a different path to become the critical path.

Block 606 determines a mismatch between current latency data 104 for one or more processes 108 associated with the critical path and previously latency data 104 associated with the process(es) 108. Based on the critical path data 106, the latency data 104 for only a subset of processes 108 within a process network 110 (e.g., the processes 108 associated with the critical path) may be analyzed. A mismatch between current latency data 104 for a process 108 and previous latency data 104 may indicate that the latency 118 for the process 108 has changed. Because the process 108 associated with the changed latency 118 is on the critical path, the change in latency 118 for the process 108 may cause a change in the perceived latency 118 for the end process 108 of the critical path.

Block 608 performs a control action with regard to the one or more processes 108 associated with the mismatch (e.g., to rectify the change in the perceived latency 118). Control actions may include alarms, reports, notifications, reallocation of network or computing resources, rejection or queuing of requests, and so forth. In some implementations, a control action may include terminating a process 108 if the latency 118 of the process 108 exceeds a predetermined amount. For example, process data 102 associated with a particular process 108 may indicate that the process 108 is non-essential. If the process 108 begins to execute, but the latency 118 of the process 108 exceeds a threshold value or a threshold percentage based on the latency data 104 for that process 108, the process may be terminated. In other implementations, a control action may include refraining from executing a process 108 if the process data 102 indicates that the process is non-essential and the current latency 118 of the path associated with the process 108 exceeds a threshold value or threshold percentage.

Figure 7:
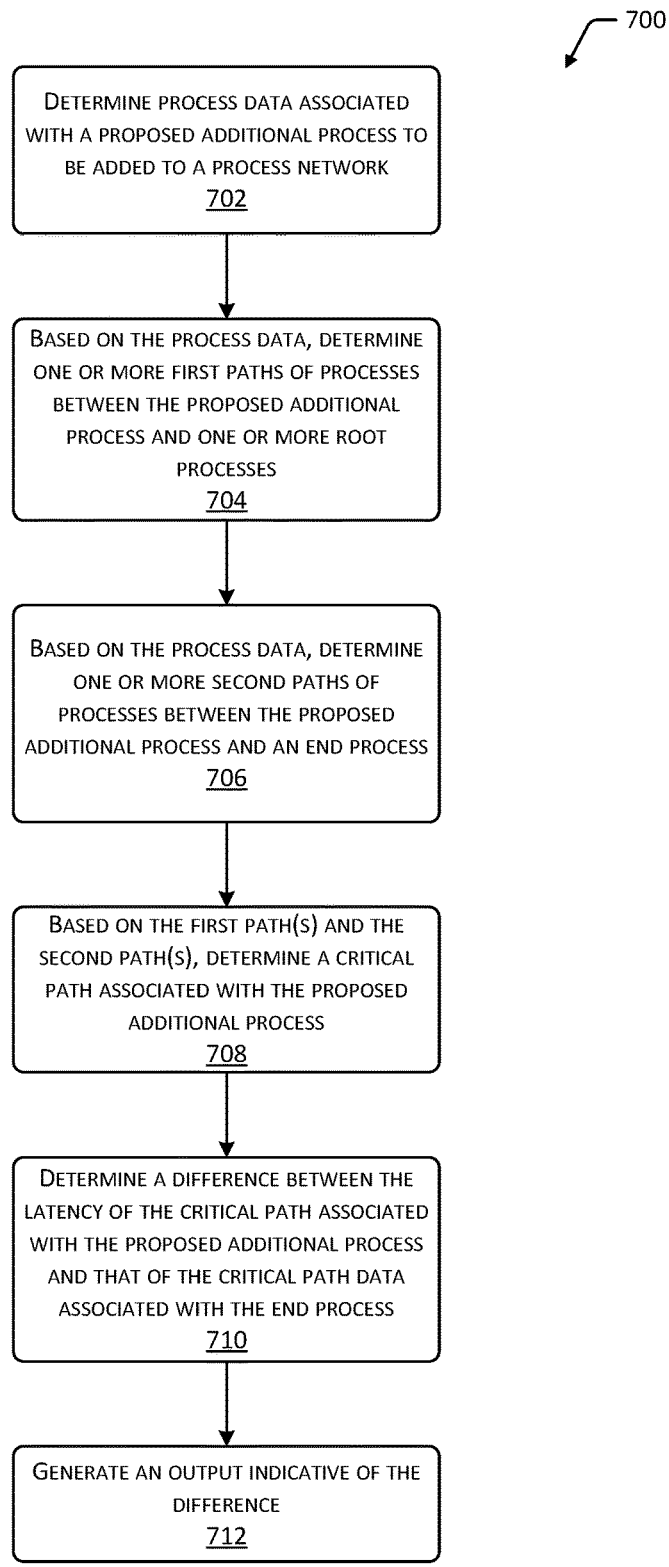
FIG. 7 is a flow diagram illustrating a method for determining a path of processes and an output associated with an addition of a proposed process to a process network.

FIG. 7 is a flow diagram 700 illustrating a method for determining a path of processes 108 and a process output 306 associated with an addition of a proposed process 108 to a process network 110. Block 702 determines process data 102 associated with a proposed additional process 108 to be added to a process network 110. For example, an entity may intend to add a new plug-in or other type of process 108 to a process network 110 but may be restricted regarding the overall perceived latency 118 of the end process 108 in the process network 110. If the proposed new process 108 is associated with the critical path of the end process 108, then the addition of the new process 108 may increase the perceived latency 118 of the end process 108. However, if the proposed new process 108 is not associated with the critical path, then the new process 108 may have an execution time 310 up to the difference between the latency 118 of the critical path and that of the path with which the new process 108 is associated, without increasing the perceived latency 118 of the end process 108. The process data 102 associated with the new process 108 may include indications of one or more of the process inputs 304 or process outputs 306 associated with the new process.

Block 704 determines, based on the process data 102, one or more first paths of processes 108 between the proposed additional process 108 and one or more root processes 108. For example, based on the process inputs 304 used by the additional process 108, one or more other processes 108 that produce process outputs 306 corresponding to the process inputs 304 may be determined. These other processes 108 may precede execution of the additional process 108. Path data 106 associated with the preceding processes 108 may be used to determine paths of processes 108 between the preceding processes 108 and one or more root processes 108. In other implementations, a critical path associated with the additional process 108 may be determined, such as by using the method illustrated in FIG. 5, to determine a path between a root process 108 and the additional process 108.

Block 706 determines, based on the process data 102, one or more second paths of processes 108 between the proposed additional process 108 and an end process 108. For example, one or more process outputs 306 generated by the additional process 108 may be used as process inputs 304 by one or more other processes 108 that occur subsequent to the additional process 108. Based on path data 106 associated with the end process 108 or one or more other processes 108 in the process network 110, one or more paths of processes 108 between the end process 108 and the additional process 108 may be determined.

Block 708 determines, based on the first path(s) and the second path(s), a critical path associated with the proposed additional process 108. For example, the path between the additional process 108 and the root process 108 that has the greatest latency 118 may be combined with the path between the additional process 108 and the end process 108 that has the greatest latency 118 to define a path having the greatest possible latency 118 associated with the additional process 108. While the additional process 108 may not necessarily be associated with the critical path of the end process 108, this path of greatest possible latency 118 may be compared with the critical path of the end process 108 to determine allowable execution times 310 of the additional process 108.

Block 710 determines a difference between the latency 118 of the critical path associated with the proposed additional process 108 and that of the critical path data 106 associated with the end process 108. For example, if the critical path associated with the end process includes an overall latency of 10 ms, while the critical path associated with the proposed additional process 108 includes an overall latency of 8 ms, a difference of 2 ms may be determined. If the proposed additional process 108 is associated with the critical path of the end process 108, based on its process inputs 304 and process outputs 306, the difference may be zero.

Block 712 generates an output indicative of the difference. For example, an entity proposing the addition of a new process 108 may request an indication of a permissible execution time 310 for the process 108 that will not violate a service level agreement (SLA) or otherwise negatively increase the perceived latency 118 of a particular process 108 in a process network 110. If the proposed new process 108 is determined to be associated with the critical path of the particular process 108, the output may include an indication that the new process 108 may not be added unless one or more process inputs 304 or process outputs 306 of the new process 108 are modified. If the latency 118 of the critical path of the particular process 108 exceeds the latency 118 of a path including the new process 108, the new process may have an execution time up to the difference between the latency of the paths without impacting the latency 118 of the particular process 108. In such a case, the output may include an indication of the difference. In some implementations, the process data 102 for the proposed new process 108 may include an expected latency 118 or one or more other characteristics of the new process 108. In such a case, the latency 118 of the path including the new process 108 may be added to the expected latency 118 of the new process 108 to determine a total latency 118. If the total latency 118 exceeds the latency 118 of the critical path, the output may include an indication that the new process 108 may not be added unless one or more possible modifications are made to the new process 108 to reduce the latency 118. In some implementations, the output may include one or more recommendations to reduce the latency 118 of the new process 108. For example, a process 108 that performs multiple steps, only a subset of which require a particular process input 304, may be divided into separate processes 108 that may execute in parallel, reducing the overall perceived latency 118 caused by the new process 108.

As an illustrative example based on the process network 110 of FIG. 2, an entity may propose the addition of a new process 108 between the second process 108(2) and the seventh process 108(7). The latency 118 of the critical path (which includes the first, fourth, fifth, and seventh processes 108) may be 6 ms, while the latency 118 of the path including the first, second, and seventh processes may be 4 ms. Therefore, the new process 108 may have a latency 118 of up to the difference between the latency 118 of these two paths: 2 ms.

Figure 8:
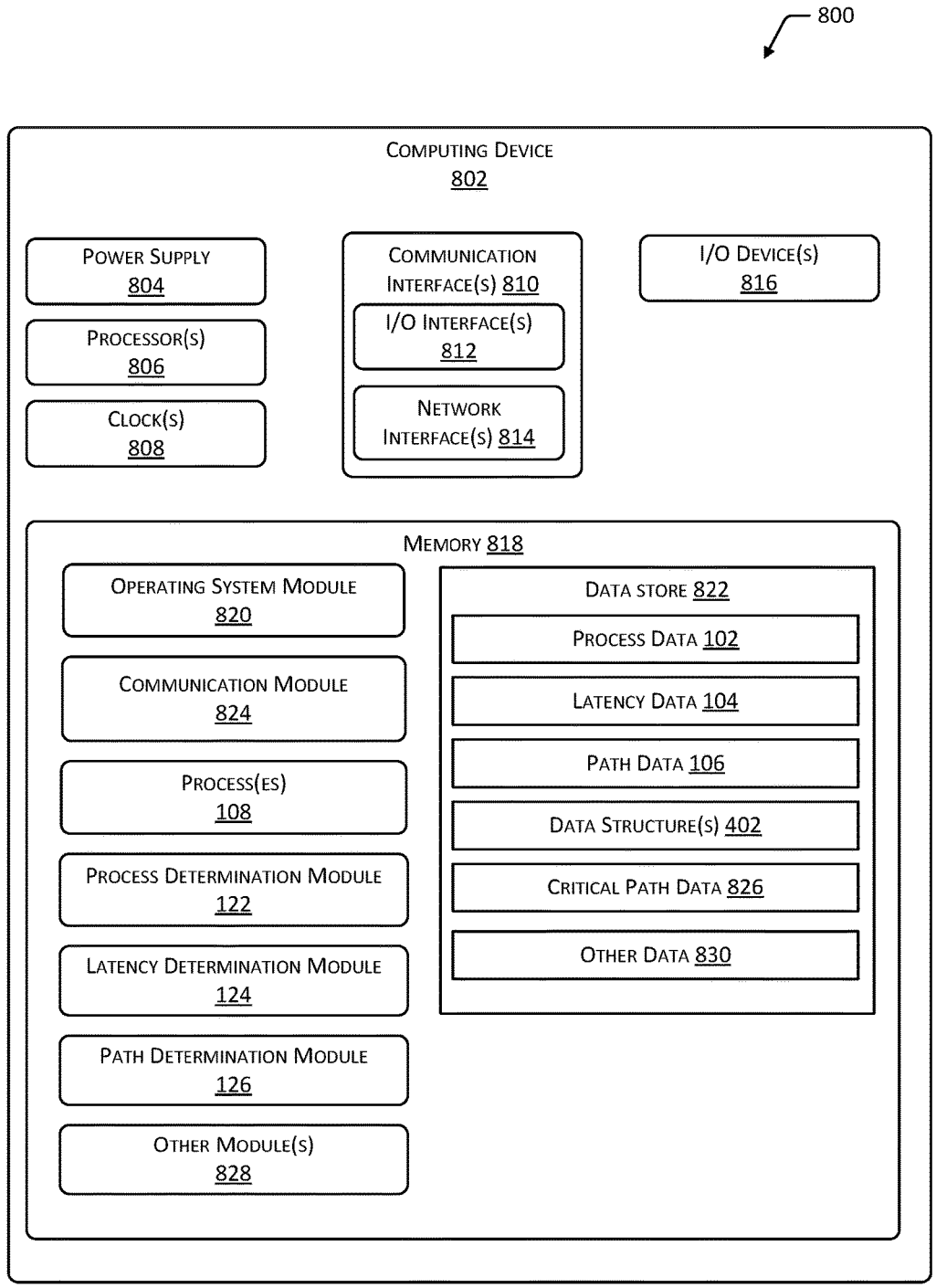
FIG. 8 is a block diagram illustrating a computing device within the scope of the present disclosure.

FIG. 8 is a block diagram 800 illustrating a computing device 802 within the scope of the present disclosure. The computing device 802 may include one or more process monitoring servers 120, requesting devices 114, one or more computing devices 802 or CRSM configured to store the process network 110, or other computing devices 802 or CSRM in communication therewith.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock(s) 808 to generate a timestamp, trigger a preprogrammed action, and so forth. The clock(s) 808 may be used to measure latency 118 associated with processes 108 or paths of processes 108 in units of time or relative units, such as processor cycles. The clock(s) 808 may also be used to determine particular times at which processes 108 begin executing and particular times at which processes 108 are completed.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including LANs, wireless LANs, WANs, wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more CRSM. The CRSM may be any one or more of an electronic storage medium, a magnetic storage medium, an optical storage medium, a quantum storage medium, a mechanical computer storage medium, and so forth. The memory 818 may provide storage of computer-readable instructions, data structures 402, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 may be configured to establish communications with one or more other computing devices 802, such as requesting devices 114, and process monitoring servers 120. The communications may be authenticated, encrypted, and so forth.

The memory 818 may store the process determination module 122. As described previously with regard to FIG. 1, the process determination module 122 may determine process data 102 associated with one or more processes 108. The process data 102 may include indications of process inputs 304, process outputs 306, and other characteristics of the process(es) 108. For example, the process determination module 122 may be configured to access rules, algorithms, code, and so forth associated with one or more processes 108 to determine the process data 102. In other implementations, the process determination module 122 may determine at least a portion of the process data 102 based on the execution of one or more of the processes. For example, if a first process 108 executes responsive to completion of a second process 108, the process output 306 of the second process 108 may be used as a process input 304 by the first process 108.

The memory may also store the latency determination module 124. The latency determination module 124 may determine latency data 104 associated with one or more of the processes 108. The latency data 104 may include indications of the latency 118 for at least a subset of the processes 108. In some implementations, the latency data 104 may also include time data 312 indicative of the times at which particular latencies 118 occurred. For example, the latency determination module 124 may access the clock(s) 808 to determine time(s) at which one or more processes 108 begin to execute and finish executing. Based on the determined latency values and time data 312, the latency determination module 124 may also generate a historical profile of the latency 118 for a process 108 over time.

The memory 818 may further store the path determination module 126. The path determination module 126 may determine path data 106 associated with one or more processes 108. The path data 106 may indicate process associations 316 between particular processes 108 that may define a path with which the particular processes 108 are associated. In some implementations, the path data 106 may be determined from the processes 108, such as by determining the times at which particular processes 108 execute based on process inputs 304 received from other processes 108. In other implementations, the path determination module 126 may determine path data 106 based at least in part on the process data 102. For example, based on the process inputs 304 and process outputs 306 associated with one or more processes 108, the path determination module 126 may determine relationships between processes 108, such as processes 108 that depend upon the process outputs 306 of other processes 108 for use as process inputs 304. The path determination module 126 may also be configured to determine critical path data 826 indicative of a critical path associated with one or more processes 108. For example, a critical path for a particular process 108 may include the path of processes 108 having the greatest latency 118 when compared to other paths associated with the particular process 108. In some implementations, the critical path for a process 108 may be determined using the method illustrated in FIG. 5. The path determination module 126 may further be configured to generate one or more data structures 402 associating particular paths of processes 108 with latency 118 values, indications of critical path data 826, or other data.

Other modules 828 may also be present in the memory 818. For example, encryption modules may be used to encrypt and decrypt communications between computing devices 802. Authentication modules may be used to authenticate communications sent or received by computing devices 802. Other modules 828 may further include modules processing user input, generating output to be provided to users, determining possible modifications to prospective new processes 108 to reduce the latency 118 thereof, and so forth.

Other data 830 within the data store 822 may include user input data, such as configurations and settings associated with computing devices 802. Other data 830 may include security data, such as encryption keys and schema, access credentials, and so forth.

In different implementations, different computing devices 802 may have different capabilities or capacities. For example, process monitoring servers 120 may have significantly more processor 806 capability and memory 818 capacity compared to the processor 806 capability and memory 818 capacity of requesting devices 114.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
receive a request to add a new process to a plurality of processes executing on the one or more hardware processors, wherein a first process of the plurality of processes generates a first output based at least in part on a second output generated by the new process;
access the first process of the plurality of processes executing on the one or more processors, wherein the first process is configured to determine the first output based at least in part on one or more inputs determined by the new process and one or more second processes of the plurality of processes;
determine a particular input of the one or more inputs received latest by the first process;
determine a particular second process of the one or more second processes associated with the particular input;
based on the particular second process being associated with the particular input, determine that the particular second process is associated with a critical path of the first process;
generate critical path data indicative of the critical path associated with the first process, wherein the critical path includes an indication of the particular second process and a length of time associated with generation of the first output by the first process;
determine first latency data associated with the first process, the first latency data including a first execution time of the first process;
determine second latency data associated with the particular second process, the second latency data including a second execution time of the particular second process;
determine, based on the critical path data, path latency data associated with the critical path, the path latency data including at least the first execution time and the second execution time, wherein the path latency data indicates the length of time associated with the generation of the first output;
determine first path data indicative of a first path of processes between the new process and a root process that precedes the new process;
determine third latency data associated with a third execution time of the first path of processes;
determine second path data indicative of a second path of processes between the new process and the first process;

determine fourth latency data associated with a fourth execution time of the second path of processes;
determine process latency data based at least in part on a sum of the third execution time and the fourth execution time;
determine a fifth execution time associated with the new process;
determine that the fifth execution time is less than a difference between the path latency data and the process latency data; and
based on the fifth execution time being less than the difference, add the new process to the plurality of processes.

2. The system of claim 1, further comprising the computer-executable instructions to:
determine one or more third processes configured to provide at least one input used by the particular second process;
determine a particular input of the at least one input used by the particular second process received subsequent to each other input of the at least one input;
determine a particular third process of the one or more third processes associated with the particular input of the at least one input;
based on the particular third process being associated with the particular input of the at least one input received subsequent to each other input of the at least one input, determine that the particular third process is associated with the critical path;
generate the critical path data to further include an indication of the particular third process;
determine fifth latency data associated with the particular third process, the fifth latency data including a fifth execution time of the particular third process; and
determine the path latency data to further include the fifth execution time.

3. The system of claim 1, further comprising computer-executable instructions to:
determine a change in latency associated with the first process;
determine a modification to one or more of the critical path data or the path latency data, associated with the change in latency; and
perform a control action associated with the modification to the one or more of the critical path data or the path latency data.

4. The system of claim 3, further comprising computer-executable instructions to:
responsive to the change in latency, determine one or more of:
a first difference between a first modified execution time of the first process and the first execution time; or
a second difference between a second modified execution time of the particular second process and the second execution time;
wherein the control action includes providing an output indicative of the one or more of the first difference or the second difference.

5. A method comprising:
accessing an end process configured to determine an output based at least in part on one or more inputs determined by a first set of processes;
determining a first process of the first set of processes that corresponds to an input of the one or more inputs received latest by the end process;

determining, based on the first process completing subsequent to each other process of the first set of processes, that the first process is included in a critical path associated with the end process;

generating critical path data indicative of the end process and the first process, wherein the critical path data indicates a length of time associated with generation of the output by the end process;

determining, based on the critical path data, path latency data based at least in part on a first execution time of the first process and a second execution time of the end process, wherein the path latency data indicates the length of time associated with generation of the output;

receiving process data associated with a second process, the process data indicating inputs associated with the second process;

determining first path data indicative of one or more of: a root process or one or more third processes between the second process and the root process;

determining first latency data associated with an execution time of the one or more of the root process or at least a subset of the one or more third processes;

determining a difference between the path latency data and a sum based on at least the first latency data; and in response to the difference being greater than a threshold value, adding the second process to a plurality of processes that includes the end process and the first set of processes.

6. The method of claim 5, wherein determining the first process includes:
   determining a particular input received by the end process subsequent to each other input of the one or more inputs.

7. The method of claim 5, further comprising:
   determining one or more third processes configured to generate at least one input associated with the first process;
   determining a particular third process of the one or more third processes that completed subsequent to each other process of the one or more third processes; and
   generating the critical path data to further indicate the particular third process.

8. The method of claim 5, further comprising:
   determining a latency associated with the end process that exceeds the path latency data;
   determining one or more of:
      a current execution time of the first process that exceeds the first execution time; or
      a current execution time of the end process that exceeds the second execution time; and
   performing a control action to modify the one or more of the current execution time of the first process or the current execution time of the end process.

9. The method of claim 5, further comprising:
   determining a latency associated with the end process that exceeds the latency indicated by the path latency data;
   determining modified critical path data indicative of at least the end process and one or more second processes;
   determining a difference between the critical path data and the modified critical path data; and
   performing a control action with regard to one or more of the end process or the one or more second processes.

10. The method of claim 5,
    wherein the second process is configured to generate a second output and the end process is configured to use the second output generated by the second process as an input; and providing an output indicative of the difference, the difference corresponding to an execution time for the second process.

11. The method of claim 5, further comprising:
    determining second path data indicative of one or more fourth processes between the second process and the end process; and
    determining second latency data associated with an execution time of at least a subset of the one or more fourth processes;
    wherein the sum is further based on the second latency data.

12. The method of claim 5, further comprising:
    determining a modification to the critical path data to form modified critical path data;
    determining a difference between the critical path data and the modified critical path data;
    determining one or more processes associated with the difference; and
    performing a control action associated with the one or more processes.

13. A system comprising:
    one or more memories storing computer-executable instructions; and
    one or more hardware processors configured to execute the computer-executable instructions to:
       receive a request to add an additional process to a plurality of processes including a root process and an end process, wherein the end process is configured to determine a first output based at least in part on one or more inputs determined by one or more of the root process or an intermediate process;
       generate critical path data associated with the end process, the critical path data indicating a critical path for the end process that includes the root process, wherein the critical path indicates a length of time associated with generation of the first output by the end process;
       determine, based on the critical path data, path latency data indicating an execution time associated with the critical path for the generation of the first output by the end process;
       determine process data indicative of one or more inputs associated with the additional process, wherein the additional process is configured to determine a second output used as an input for one or more of the end process or the intermediate process;
       determine correspondence between the one or more inputs associated with the additional process and one or more outputs of at least a subset of the plurality of processes;
       determine first path data indicating an execution time associated with the root process and the at least a subset of the plurality of processes;
       determine second path data indicating an execution time associated with one or more of the end process or the intermediate process;
       determine a difference between the path latency data and a sum of the first path data and the second path data, the difference corresponding to an allowable execution time for the additional process; and
       in response to an execution time of the additional process being less than the allowable execution time, add the additional process to the plurality of processes.

14. The system of claim 13, wherein the computer-executable instructions to determine the critical path include computer-executable instructions to:
- determine one or more intermediate processes configured to provide outputs used as inputs by the end process;
- determine a particular intermediate process of the one or more intermediate processes that provided an input to the end process subsequent to each other intermediate process of the one or more intermediate processes;
- determine, based on the particular intermediate process providing the input subsequent to each other intermediate process, that the particular intermediate process is associated with the critical path; and
- generate the critical path data to further indicate the particular intermediate process.

15. The system of claim 13, wherein the computer-executable instructions to determine the critical path include computer-executable instructions to:
- determine an input associated with the end process to be a latest input received by the end process before execution of the end process;
- determine a particular intermediate process associated with the latest input; and
- determine the critical path to include the particular intermediate process.

16. The system of claim 13, further comprising computer-executable instructions to:
- in response to the execution time for the additional process being greater than the allowable execution time, modify the additional process to reduce the execution time for the additional process.

17. The system of claim 13, further comprising computer-executable instructions to:
- determine a current latency associated with the end process, wherein the current latency exceeds the latency indicated by the path latency data;
- determine at least a subset of the plurality of processes associated with the critical path;
- determine a current execution time associated with the at least a subset of the plurality of processes associated with the critical path;
- determine a difference between the current execution time for a particular process and latency data indicating an expected execution time for the particular process; and
- perform a control action associated with the particular process.

18. The system of claim 13, further comprising computer-executable instructions to:
- determine a current latency associated with the end process, wherein the current latency exceeds the latency indicated by the path latency data;
- determine a modified critical path associated with the current latency;
- determine a difference between the critical path associated with the plurality of processes and the modified critical path, the difference indicating at least one particular process; and
- perform a control action with regard to the at least one particular process.

19. The system of claim 13, further comprising computer-executable instructions to:
- determine a modification to the critical path data;
- determine one or more processes associated with the modification; and
- perform a control action associated with the one or more processes.

20. The system of claim 13, further comprising computer-executable instructions to: in response to the execution time for the additional process being greater than the allowable execution time, prevent addition of the additional process to the plurality of processes.

* * * * *